Patented Aug. 12, 1952

2,606,912

UNITED STATES PATENT OFFICE 2,606,912

SEPARATION OF DESOXYCHOLIC ACID

Robert H. Sifferd, Clarendon Hills, Ill., assignor, by mesne assignments, to Armour and Company, Chicago, Ill., a corporation of Illinois No Drawing. Application May 5, 1949,
Serial No. 91,633

9 Claims. (Cl. 260—397.1)

This invention relates to the separation of desoxycholic acid from organic substances containing the same and for the purification of desoxycholic acid.

Under present and past practice, relatively long and extensive procedure has been employed in connection with the separation of desoxycholic acid from organic substances in which it is present, and such procedure has not only been tedious and expensive but also has resulted in low yields.

I have found that desoxycholic acid forms a complex or "coordination compound" with benzene ($C_6H_6$) which is rather little soluble in tertiary butyl alcohol and which will crystallize preferentially from tertiary butyl alcohol even in the presence of substantial proportions of the other bile acids including cholic acid.

This behavior of desoxycholic acid permits its separation from grossly contaminated mixtures of bile acids and bile pigments by the use of solvents alone.

The conventional methods for the isolation and purification of desoxycholic acid require the fractional precipitation of this acid as its barium salt (or other inorganic complex) to separate it from substantial proportions of cholic acid, the barium or other salts of which are more soluble. This procedure requires thence the separation of the barium or other inorganic portion of the compound by precipitation with carbonate or sulfate ion, the removal of the insoluble inorganic compound, precipitation of the free desoxycholic acid and then a repetition of the entire procedure to improve the purity of the desoxycholic acid.

In one phase of my invention, the procedure comprises dissolving a mixture of bile acids and bile pigments in a suitable quantity of hot tertiary butyl alcohol, adding benzene equal to approximately one-half of the volume of alcohol used, and cooling the mixture, whereupon the benzene coordination compound of desoxycholic acid crystallizes out leaving the other bile acids and bile pigments in solution. The benzene-desoxycholic acid compound is removed by filtration and may be recrystallized directly from tertiary alcohol, then converted to the free acid by any suitable means, or, if a slightly less pure acid is desired, the first benzene compound may be converted directly to the free acid. In the former case, desoxycholic acid with a melting point of 174–176° C. is easily obtained.

It is well known to those familiar with the chemistry of the bile acids that certain bile acids, notably desoxycholic acid and apocholic acid, form "coordination compounds" with many different types of organic compounds. These coordination compounds, most of which crystallize readily from solution, appear to be molecular associations of one or more molecules of the bile acids with one molecule of the non-bile acid substance. Relatively few organic substances have been found which do not, in fact, form these coordination compounds with desoxycholic acid. This fact has been largely responsible for the difficulty in isolating and purifying desoxycholic acid in the past.

An object of the present invention is to provide a process in which, by a very brief step or procedure, desoxycholic acid is effectively separated from the other substances in a commercial form and with a high yield. Yet another object is to provide a process by which a high purification of desoxycholic acid is obtained with an excellent yield in a minimum of steps. Other specific objects and advantages will appear as the specification proceeds.

I have found that the hydroxycholanic acids as a group are quite soluble in tertiary butyl alcohol even at room temperature when that solvent is unmixed with other organic solvents. In the presence, however, particularly of non-polar substances admixed with said butyl alcohol, desoxycholic acid becomes relatively insoluble at room temperature. This phenomenon takes place in the presence of quantities of said non-polar substances too small in proportion to the tertiary alcohol to be considered to have an appreciable effect on the solubility of the bile acid per se. By "non-polar" is meant a non-electrolyte and an organic compound the atoms of which are held in electromagnetic union by sharing a common pair of electrons. Thus, alcohol, ketones, acids, and bases are polar substances, while benzene, xylene, toluene, chlorobenzene, dichlorobenzene and the volatile aliphatic hydrocarbons are non-polar substances.

I have been unable to obtain any definite coordination compound of desoxycholic acid with tertiary butyl alcohol and am forced to assume, for practical purposes, that it does not form one with that solvent.

Due to this fact and to the fact cited above that the hydroxycholanic acids are in general quite soluble in tertiary butyl alcohol, we have in tertiary butyl alcohol an ideal solvent for the separation of desoxycholic acid from the other naturally occurring bile acids.

I dissolve the bile acid mixture in tertiary butyl alcohol and need add only sufficient non-polar solvent to form the coordination compound with the desoxycholic acid content of the mixture, whereupon the desoxycholic acid-solvent coordination compound crystallizes out substantially free of the other bile acids. The coordination compound may be recrystallized then directly from the tertiary alcohol without further addition of non-polar material.

I have found that benzene, toluene, xylene, monochlorbenzene, the dichlorbenzenes and many of the aliphatic hydrocarbons are capable of forming coordination compounds with desoxycholic acid in tertiary butyl alcohol and precipitate therefrom.

These different coordination compounds have somewhat differing solubilities in the tertiary alcohol, but any of them can be used to practical advantage for the separation of desoxycholic acid.

I have observed, further, that the same coordination compounds of apocholic acid and desoxycholic acid have sufficiently different solubilities in tertiary butyl alcohol to permit easy separation of one from the other by fractional crystallization. For example, the xylene coordination compound of apocholic acid is readily soluble in the tertiary alcohol at room temperature, whereas, the coordination compound of xylene with desoxycholic acid precipitates rapidly and almost quantitatively from tertiary butyl alcohol.

In addition to the use of tertiary butyl alcohol, I have found that tertiary amyl alcohol may also be effectively employed in the same way as above described for tertiary butyl alcohol.

Specific examples of the process may be set out as follows:

The ethyl alcohol solution obtained by extracting 2000 lbs. of dry crude mixed bile acids with 250 gallons of anhydrous alcohol was concentrated by atmospheric distillation to approximately one-half volume. One hundred fifty gallons of water were added with sufficient caustic soda solution to bring the aqueous alcoholic concentrate to an alkalinity of approximately pH 12. Distillation was resumed and continued until the aqueous alkaline concentrate was substantially alcohol-free.

The dark brown alkaline sirup, 140 gallons in volume, was acidified to pH 4 with concentrated sulfuric acid after the addition of 50 gallons of tertiary butyl alcohol. Into the mixture were stirred 50 gallons of benzol and the dispersion was then allowed to stand for several hours without agitation to permit crystal growth of the crude desoxycholic acid-benzene complex.

The crystalline material was separated from mother liquor by filtration, and was washed several times with benzol containing 20% tertiary butyl alcohol until free of adhering mother liquor.

The crude desoxycholic acid complex then was recrystallized by dissolving in hot tertiary butyl alcohol, using approximately 2.5 liters alcohol for each kilogram dry weight of the crude acid complex. After hot filtration in the presence of activated carbon, benzol was added at the rate of 30 liters per 100 liters of filtrate. The mixture was cooled under agitation, whereupon the desoxycholic acid-benzene complex crystallized out and was again removed by filtration.

After being washed with a mixture of benzol and tertiary butyl alcohol, the cake was suspended in distilled water and boiled under agitation for several hours for removal of the benzene. When the benzene had been completely removed, the suspension of free desoxycholic acid was cooled, centrifuged, washed with distilled water and dried. The yield was 180 pounds of free desoxycholic acid, melting point 173–175° C.

The above process steps were also carried out while using tertiary amyl alcohol and substantially the same results were obtained.

While, in the foregoing specification, I have set out a specific procedure in considerable detail, it will be understood that such details may be varied widely by those skilled in the art without departing from the spirit of my invention.

I claim:

1. In a process for the separation of desoxycholic acid from organic substances containing cholic and desoxycholic acids, the steps of dissolving said organic substances including said cholic and desoxycholic acids in a solvent selected from the group consisting of tertiary butyl alcohol and tertiary amyl alcohol, and precipitating the desoxycholic acid in the presence of a precipitating agent selected from the group consisting of a non-polar, volatile hydrocarbon and its halogen substituted derivatives to form a coordination compound with desoxycholic acid.

2. In a process for the separation of desoxycholic acid from organic substances, comprising cholanic acids and their derivatives or degradation products, the steps of dissolving said organic substances in a solvent selected from the group consisting of tertiary butyl alcohol and tertiary amyl alcohol, introducing a precipitating agent selected from the group consisting of a non-polar, volatile hydrocarbon and its halogen substituted derivatives to form a coordination compound with desoxycholic acid and thereby precipitate the desoxycholic acid, and separating the precipitate.

3. In a process for the separation of desoxycholic acid from organic substances containing cholic acid and desoxycholic acid, the steps of dissolving the substances including the cholic and desoxycholic acids in a solvent selected from the group consisting of tertiary butyl alcohol and tertiary amyl alcohol, adding benzene to precipitate the desoxycholic acid and removing the benzene to recover the desoxycholic acid substantially free of cholic acid.

4. In a process for the separation of desoxycholic acid from organic substances containing desoxycholic acid, the steps of dissolving the substances in a solvent selected from the group consisting of tertiary butyl alcohol and tertiary amyl alcohol, and adding xylene to precipitate the desoxycholic acid.

5. In a process for the separation of desoxycholic acid from organic substances containing cholic acid and desoxycholic acid, the steps of dissolving said substances including said cholic and desoxycholic acids in tertiary butyl alcohol, and precipitating the desoxycholic acid by the addition of a precipitating agent selected from the group consisting of a non-polar, volatile hydrocarbon and its halogen substituted derivatives to form a coordination compound with desoxycholic acid.

6. In a process for the separation of desoxycholic acid from organic substances containing cholic acid and desoxycholic acid, the steps of dissolving said substances in tertiary amyl alcohol, and precipitating the desoxycholic acid in the presence of a precipitating agent selected from the group consisting of a hydrocarbon and its halogen substituted derivatives to form a coordination compound with desoxycholic acid.

7. In a process for the separation of desoxycholic acid from organic substances comprising cholanic acids including cholic and desoxycholic acids and their derivatives and degradation products, the steps of dissolving the substances in an aqueous alkaline solution, and precipitating said substances with mineral acid in the presence of tertiary butyl alcohol and benzene the tertiary butyl alcohol being in sufficient volume to dissolve completely the cholic acid.

8. In a process for the separation of desoxycholic acid from mixed bile acids including cholic acid, the steps of dissolving the mixed bile acids in tertiary butyl alcohol the alcohol being in sufficient volume to dissolve completely the cholic acid, and precipitating the desoxycholic acid coordination compound by the addition of benzene.

9. In a process for the purification of a coordination compound of desoxycholic acid with a non-polar, volatile organic substance selected from the group consisting of a hydrocarbon and its halogen substituted derivatives, the steps of dissolving said coordination compound in tertiary butyl alcohol by the application of heat, and cooling the dissolved mixture for the reprecipitation of the coordination compound.

ROBERT H. SIFFERD.

REFERENCES CITED

The following references are of record in the file of this patent:

FOREIGN PATENTS

| Number | Country | Date |
| --- | --- | --- |
| 105,769 | Great Britain | Dec. 11, 1919 |
| 582,772 | Great Britain | Nov. 27, 1946 |